United States Patent [19]
Cox et al.

[11] 3,943,468
[45] Mar. 9, 1976

[54] AMPLITUDE EQUALIZER USING MIXING FOR ERROR DETECTION

[75] Inventors: Donald Clyde Cox, New Shrewsbury; Douglas Otto John Reudink, Sea Girt, both of N.J.

[73] Assignee: Bell Telephone Laboratories Incorporated, Murray Hill, N.J.

[22] Filed: Oct. 29, 1974

[21] Appl. No.: 518,588

[52] U.S. Cl. .................. 333/18; 325/42; 325/323; 325/475; 325/477; 328/163
[51] Int. Cl.² ..................... H04B 3/14; H04B 1/10
[58] Field of Search .......... 328/162, 163, 171, 168; 179/15 AE, 15 BL; 325/42, 305, 323, 324, 326, 473, 474, 475, 476, 477; 333/17, 18

[56] References Cited
UNITED STATES PATENTS

| | | | |
|---|---|---|---|
| 3,368,168 | 2/1968 | Lucky | 333/18 |
| 3,649,916 | 3/1972 | Winters | 325/323 X |
| 3,676,804 | 7/1972 | Mueller | 333/18 |
| 3,708,766 | 1/1973 | Sha et al. | 325/42 X |
| 3,736,414 | 5/1973 | McAuliffe | 325/42 X |
| 3,758,863 | 9/1973 | Ungerboeck | 325/473 X |
| 3,777,275 | 12/1973 | Cox | 330/10 |
| 3,787,762 | 1/1974 | Sato | 325/42 |
| 3,868,603 | 2/1975 | Guidoux | 333/18 |

*Primary Examiner*—John S. Heyman
*Assistant Examiner*—L. N. Anagnos
*Attorney, Agent, or Firm*—Daniel D. Dubosky

[57] ABSTRACT

Apparatus for accomplishing amplitude equalization between two input signals includes circuitry for generating the sum and the difference of the two signals, mixing the sum and the difference and applying the low-pass filtered version of the mixed resultant as a feedback error signal of very low frequency to an attenuator associated with one of the two input signals. A hybrid combiner may be used to generate the sum and the difference from the two input signals. The phases of the two input signals are unaffected by the amplitude equalization. A particular application of the invention is in a LIND (linear amplification using nonlinear devices) amplifier such as that disclosed in U.S. Pat. No. 3,777,275 issued Dec. 4, 1973 to D. C. Cox.

4 Claims, 4 Drawing Figures

AMPLITUDE EQUALIZER USING MIXING FOR ERROR DETECTION

BACKGROUND OF THE INVENTION

This invention relates to amplitude equalization circuits and more particularly to amplitude equalization circuits which generate a feedback error signal for adjusting the amplitude of one of two input signals, thereby maintaining amplitude equality between the two input signals.

In frequency division multiplexers and communications systems having a plurality of signals or signal components, it is frequency necessary for proper system operation to maintain amplitude equality between the signals or signal components. Because electrical components in such systems drift with time and temperature changes, it is necessary to make adjustments in order to maintain amplitude equality between signals. Although the circuit of the invention is applicable in any environment where amplitude equality between two signals or signal components must be maintained, it is particularly well suited for a LIND (linear amplification using nonlinear devices) amplifier.

In a LIND amplifier, an original bandpass signal to be amplified is separated into two components. These components are separately amplified by nonlinear devices and the amplified resultants recombined to produce a replica of the original bandpass signal. Amplitude equality between the amplified components must be maintained for the LIND amplifier to function properly.

Prior art amlitude equalizing techniques such as those used in voltage regulator circuits equalize two DC voltages. In such circuits the output voltage is made equal to a specified fraction or multiple of a DC reference voltage. Adapting such techniques for equalizing the amplitudes of the two LIND component signals would require additional circuitry such as two separate amplitude detectors to provide inputs for such prior art regulators and either two signal sampling devices or two couplers. This additional circuitry would result in both added cost and incomplete equalization of the desired signal amplitudes since the regulator error signal would be subject to the different time and temperature drifts in the two amplitude detectors.

The present invention eliminates the need for both the two separate signal samplers and the two separate detectors.

SUMMARY OF THE INVENTION

In accordance with the present invention, the sum and difference of two input signals are generated. The sum and difference quantities are then multiplied in a product mixer to produce a product signal having both second harmonic terms and very low frequency terms which latter terms result from slow variations of the input signals. The mixer output is low-pass filtered to produce an error signal. The error signal is amplified and the amplified error signal is applied as a feedback signal to an attenuator which controls the amplitude of one of the two input signals. Accordingly, amplitude equality (amplitude balance) is maintained between the two input signals. An amplitude equalizer according to the invention may be used to maintain amplitude equality among three or more signals by equalizing these signals two at a time.

DETAILED DESCRIPTION

Figure 1:
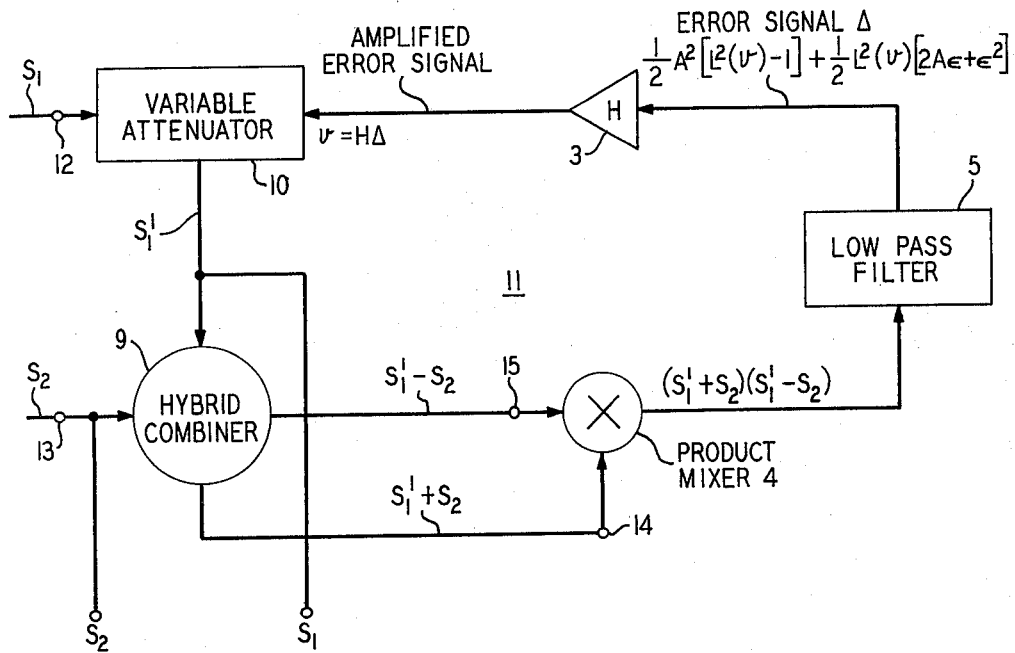
FIG. 1 is a generalized block diagram of an amplitude equalizer in accordance with the present invention.

In the most general case, as shown in FIG. 1, $S_1$ and $S_2$ are phase modulated input signals applied to amplitude equalizer 11 via terminals 12 and 13 respectively. Amplitude equality is achieved by using a variable attenuator 10 to adjust the amplitude of only one of the two signals, $S_1$, to produce a signal $S_1'$ whose amplitude is equal to the amplitude of $S_2$. $S_1$ is a signal of the general form $(A+\epsilon)\sin[\omega_1 t + \alpha(t)]$ and $S_1'$ is a signal of the general form $L(v)(A+\epsilon)\sin[\omega_1 t + \alpha(t)]$, where A is a constant, $\epsilon$ is a small positive amplitude difference between $S_1$ and $S_2$, $\omega_1$ is the radian frequency of $S_1$, $t$ is time, $\alpha(t)$ is a phase variation and $L(v)$ is an attenuation factor controlled by a variable voltage $v$. Thus, $S_1'$ differs from $S_1$ only in amplitude as a result of attenuation by variable attenuator 10. $S_2$ is a signal of the general form $A \sin[\omega_2 t + \beta(t)]$, where $\omega_2$ is the radian frequency of $S_2$, and $\beta(t)$ is another phase variation. The sum $S_1'+S_2$ and the difference $S_1'-S_2$ are generated by hybrid combiner 9 which may be any device, such as a magic tee device, for generating a sum and a difference from the two inputs. The sum $S_1'+S_2$ is applied to product mixer 4 via terminal 14. The difference $S_1'-S_2$ is applied to produce mixer 4 via terminal 15. Mixer 4 multiplies $S_1'+S_2$ and $S_1'-S_2$ yielding a product signal which may be represented mathematically by $$(S_1'+S_2)(S_1'-S_2) = (S_1')^2-S_2^2 = L^2(v)(A+\epsilon)^2 \sin^2[\omega_1 t+\alpha(t)]- A^2 \sin^2[\omega_2 t+\beta(t)]. \qquad 1.$$

The right-hand side of equation (1) may be shown to be equal to $$L^2(v) [A+\epsilon)^2/2][1-\cos 2(\omega_1 t+\alpha(t))]-(A^2/2)[1-\cos 2(\omega_2 t+\beta(t))] \qquad 2.$$

using well-known trigonometric identities. Expression (2) contains both second harmonic terms of radian frequencies $2\omega_1$ and $2\omega_2$ and very low frequency terms which contain the very slow variations of $A$, $\epsilon$ and $L(v)$. The product signal represented by expression (2) is then low-pass filterd by filter 5 to remove the second harmonic terms. The output of the filter is an error signal $\Delta$ which may be represented mathematically by $$\Delta = \tfrac{1}{2} L^2(v)(A+\epsilon)^2 - \tfrac{1}{2}A^2 = \tfrac{1}{2}A^2 [L^2(v)-1] + \tfrac{1}{2}L^2(v)[2 A\epsilon+\epsilon^2]. \qquad 3.$$

The error signal is amplified by high gain amplifier 3 of gain H and the amplified resultant $H\Delta$ is applied to control variable attenuator 10. The amplified error signal $H\Delta$ becomes the controlling voltage $v$ applied to the variable attenuator 10. Thus $$H\Delta + v. \qquad 4.$$

Since $\Delta$ is a function of $\epsilon$ in equation (3), it is apparent that $H\Delta$ is a function of $\epsilon$, the difference in amplitude between the two original input signals $S_1$ and $S_2$ which must be amplitude equalized. As the difference $\epsilon$ increases, the amplified voltage error signal ($H\Delta=v$) which controls attenuator 10 also increases.

The amplitude of $S_1$ must initially be greater than the amplitude of $S_2$ for amplitude equalizer 11 to operate. Accordingly, any system with which the amplitude equalizer is to be used, must be designed so that the amplitude of $S_1$ is initially greater than the amplitude of $S_2$. Therefore, $\epsilon$ is always positive and attenuator 10 will always cause the amplitude of $S_1$ to decrease until amplitude equality is achieved. Attenuator 10 is a variable voltage controlled attenuator and may be a well-known device such as a pin diode or a motor driven vane attenuator.

The invention also may be used to maintain amplitude equality among sums of three or more signals. Such amplitude equality is achieved by equalizing the amplitudes two at a time (in pairs). A variety of possible schemes may be used for amplitude equalization of three or more signals.

Figure 3:
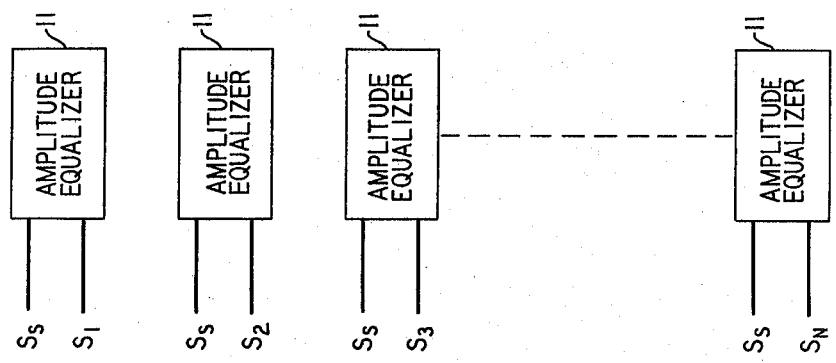
FIG. 3 shows one scheme for amplitude equalization of three or more signals.

One scheme would require that a signal $S_S$ with the smallest amplitude be chosen from a group of N+1 signals to be amplitude equalized where N is any positive integer. The signal $S_S$ would be applied to N amplitude equalizers as shown in FIG. 3. Each of the remaining N signals $S_1, S_2, S_3 \ldots S_N$, would be applied to a different amplitude equalizer 11. Thus, the amplitude of each of the remaining signals would be attenuated to be made equal to the amplitude of $S_S$.

Figure 4:
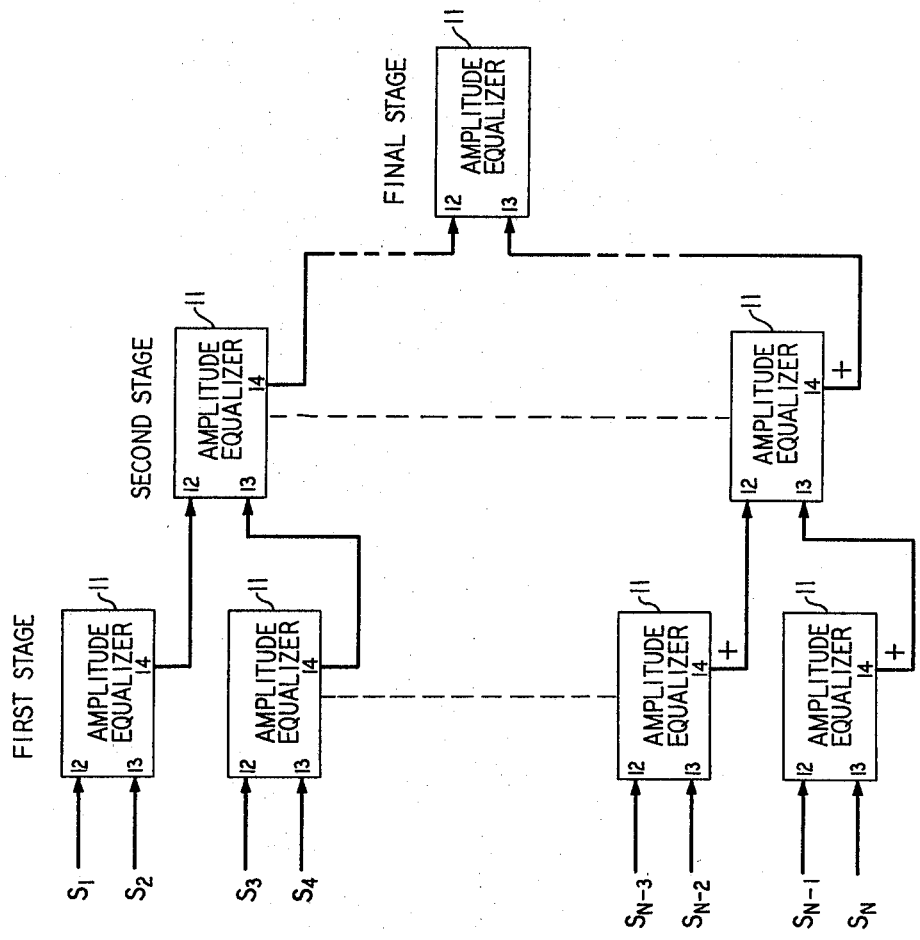
FIG. 4 is a block diagram of a scheme for amplitude equalization of sums of three or more signals.

Another scheme for achieving amplitude equalization among three or more signals is shown in FIG. 4. Signals $S_1, S_2 \ldots S_N$ to be amplitude equalized are applied to amplitude equalizers 11 in pairs. If N is odd, then one signal may be applied to two equalizers. The signal of any pair with the largest amplitude is applied to attenuator 10 and these two signals are amplitude equalized in a first stage or first level of equalization shown in FIG. 4. In a second stage or level of equalization respective sums of the two signals comprising any pair are amplitude equalized. This procedure is continued to a third stage and subsequent stages as necessary until amplitude equalization is achieved among sums of signals. The output of equalizer 11 of the final stage in FIG. 4 may be represented by $$a_1S_1 + a_2S_2 + \ldots a_NS_N \quad \quad 4a.$$

where $a_1, a_2 \ldots a_N$ are attenuation constants each corresponding to one of the signals $S_1, S_2 \ldots S_N$. Furthermore, as a result of the equalization process $$a_1S_1 = a_2S_2 = \ldots = a_NS_N. \quad \quad 4b.$$

For the case where N = 2, two signals are amplitude equalized as shown in FIG. 1 and the amplitude of $S_1$ is attenuated until it equals the amplitude of $S_2$. The operation of the feedback circuitry shown in FIG. 1 assures the validity of equation (4b) even where the amplitudes of signals $S_1$ and $S_2$ shown in FIG. 1 or more generally where the amplitudes of signals $S_1, S_2 \ldots S_N$ shown in FIG. 4 fluctuate.

Figure 2:
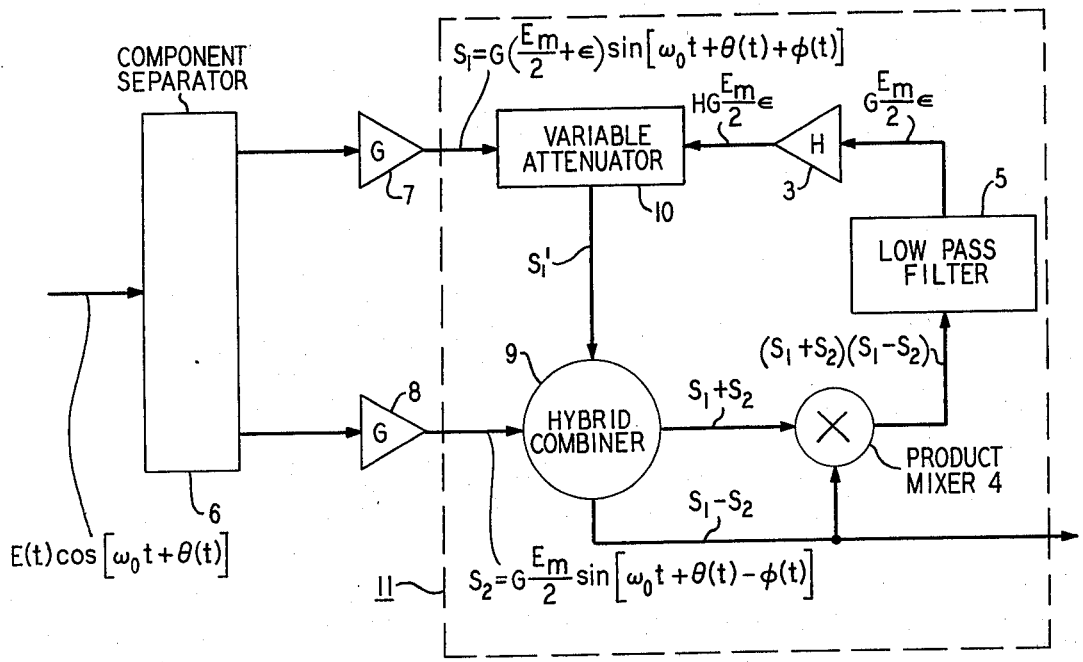
FIG. 2 is a block diagram of one possible embodiment of the amplitude equalizer arranged for use in combination with a LIND amplifier.

FIG. 2 shows the invention as embodied in a LIND (linear amplification using nonlinear devices) amplifier disclosed in U.S. Pat. No. 3,777,275. An original input signal of the general form $E(t)\cos[\omega_o t+\theta(t)]$ to be amplified is applied to component separator 6 which generates two constant amplitude signals. These two constant amplitude signals are separately amplified by nonlinear devices 7 and 8 to produce two signals $S_1$ and $S_2$ respectively. $S_1$ is a signal of the general form $G(E_m/2+\epsilon)\sin[\omega_o t+\theta(t)+\phi(t)]$ and $S_1'$ is a signal of the general form $M(v)G(E_m/2+\epsilon)\sin[\omega_o t+\theta(t)+\phi(t)]$, where $\phi(t)$ is a phase variation, $$\phi(t) = \sin^{-1}E(t)/E_m, \quad \quad 5.$$

$$\theta(t)+\phi(t) = \alpha(t), \quad \quad 6.$$

$$\theta(t)-\phi(t) = \beta(t), \quad \quad 7.$$

$E(t)$ indicates the variation of amplitude with time and $E_m$ is the maximum value of $E(t)$. $S_2$ is a signal of the general form $G(E_m/2)\sin[\omega_o t+\theta(t)-\phi(t)]$. Here, $\omega_o$ is the radian frequency of both $S_1$ and $S_2$ and therefore $$\omega_o = \omega_1 = \omega_2. \quad \quad 8.$$

Thus, $S_1$ and $S_1'$ differ only in amplitude and variable attenuator 10 processes $S_1$ to produce $S_1'$. $S_1'$ and $S_2$ are applied to a combiner 9 which may be a magic tee or other hybrid combining device. The combiner serves both as an electrical component generating a difference output in the LIND amplifier disclosed in U.S. Pat. No. 3,777,275 and as an electrical component of the amplitude equalizer. Accordingly, in FIG. 2, combiner 9 generates the difference signal which is both a linearly amplified replica of an original bandpass signal to be amplified and one signal applied to mixer 4 of the amplitude equalizer. Combining device 9 generates the sum and the difference of its two inputs $S_1'$ and $S_2$ and amplitude equalization of $S_1'$ and $S_2$ is achieved as described in the case of FIG. 1 Accordingly, the amplitude equalizer solves the problem of maintaining amplitude equality between LIND component signals.

In all cases it is to be understood that the above described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A device for equalizing the amplitudes of two input signals comprising:
   an attenuator with a control input for varying the amplitude of one of the two input signals;
   means for applying one input signal to said attenuator to produce an attenuated signal;
   means responsive to the other input signal aand said attenuated signal for generating a sum signal which is the sum of said attenuated signal and said other input signal, said means for generating also generating a difference signal which is the difference of said attenuated signal and said other input signal;
   means for mixing said sum and said difference signals to form a product signal;
   a low-pass filter for filtering the product signal to produce a low frequency error signal; and
   means for applying the error signal to said control input of said attenuator.

2. A device as described in claim 1 wherein said means for generating a sum signal and a difference signal is a hybrid combiner.

3. A device for equalizing the amplitudes of two input signals comprising:
- attenuating means having a control input and being responsive to one of said two input signals for producing an attenuated signal at its output;
- a combiner to which said attenuated signal and the other one of said two input signals are applied and from which a sum signal and a difference signal emanate, said sum signal being the sum of said attenuated signal and the other one of said two input signals and said difference signal being the difference of said attenuated signal and the other one of said two input signals;
- a product mixer for mixing said sum and said difference signals from said combiner, said mixer producing a mixed output;
- means for low-pass filtering the mixed output of said product mixer to produce a filtered output; and
- means for applying the filtered output to said control input of said attenuator means to control the attenuation of said one input signal.

4. A device for equalizing the amplitude of two input sums comprising:
- first means for equalizing the amplitudes of a pair of signals $S_1$ and $S_2$, said first means for equalizing also generating a first resulting sum of said pair of signals $S_1$ and $S_2$;
- second means for equalizing the amplitudes of a pair of signals $S_3$ and $S_4$, said second means for equalizing also generating a second resulting sum of said pair of signals $S_3$ and $S_4$;
- third means responsive to said first and second resulting sums for equalizing the first resulting sum and said second resulting sum, said third means also generating a third resulting sum of the form $a_1S_1 + a_2S_2 + a_3S_3 + a_4S_4$ where $a_1$, $a_2$, $a_3$ and $a_4$ are constants and where $a_1S_1 = a_2S_2 = a_3S_3 = a_4S_4$;
- said first, second and third means each comprising,
- an attenuator with a control input for varying the amplitude of one of its respective two input signals;
- means for applying one input signal to said attenuator to produce an attenuated signal;
- means responsive to the other input signal and said attenuated signal for generating a sum signal which is the sum of said attenuated signal and said other input signal, said means for generating also generating a difference signal which is the difference of said attenuated signal and said other input signal;
- means for mixing said sum and said difference signals to form a product signal;
- a low-pass filter for filtering the product signal to produce a low frequency error signal; and
- means for applying the error signal to said control input of said attenuator, so that said attenuator adjusts the amplitude of one of the two input signals to equal the amplitude of the other of the two input signals.

* * * * *